United States Patent [19]
Pfeiffer et al.

[11] 3,714,154
[45] Jan. 30, 1973

[54] RECOVERY OF CEPHALOTHIN SALTS

[75] Inventors: Ralph R. Pfeiffer, Kuo Shang Yang, both of Indianapolis, Ind.

[73] Assignee: Eli Lilly and Company, Indianapolis, Ind.

[22] Filed: Dec. 24, 1970

[21] Appl. No.: 101,383

[52] U.S. Cl. .............................. 260/243 C, 424/246
[51] Int. Cl. ............................................... C07d 99/24
[58] Field of Search ................................. 260/243 C

[56] References Cited

UNITED STATES PATENTS 3,218,318  11/1965  Flynn .............................. 260/243 C
3,351,597  11/1967  Higgins ........................... 260/243 C Primary Examiner—Nicholas S. Rizzo
Attorney—Everet F. Smith and John T. Reynolds

[57] ABSTRACT

This invention is addressed to an improved method for the recovery of alkali metal salts of caphalothin from aqueous solution in which a non-toxic alkali metal salt is added in the aqueous solution to precipitate the cephalothin salts substantially free of impurities.

11 Claims, No Drawings

RECOVERY OF CEPHALOTHIN SALTS

This invention relates to cephalosporin antibiotics, and more particularly to an improved method for the recovery of 7-(2'-thienylacetamido)cephalosporanic acid salts.

In U.S. Pat. No. 3,218,318 to Flynn, description is made of a new class of 7-acylamido cephalosporanic acid antibiotics. One of the most valuable groups of compounds described and claimed by Flynn are the 7-(2'-thienylacetamido)cephalosporanic acid salts (now known generically as cephalothin salts):

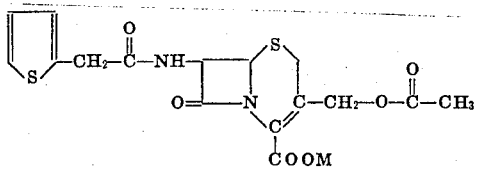

wherein M is a cation of an alkali metal(e.g., sodium, potassium, lithium). Cephalothin is now in widespread use and is commercially available in the form of the sodium salt.

In preparing the foregoing cephalothin salts on a large scale, it has been the practice to recover sodium cephalothin from aqueous solution thereof by adding to this aqueous solution a large excess(by volume) of an organic solvent which is miscible with water, such as isopropanol, to cause precipitation of the cephalothin salt.

However, as so precipitated the sodium salt of cephalothin contains one or more impurities which impart an undesirable yellow coloration to aqueous pharmaceutical solutions of the salt. The exact nature of these impurities is unknown at the present time, although it is believed that the impurity is a polycarboxylic acid material which can be precipitated with protamine. In any event, the recovery of cephalothin sodium salt using the procedure described above in which isopropanol or like organic solvent is added to an aqueous solution of the cephalothin salt to cause precipitation of the cephalothin salt also results in co-precipitation of the impurities. Thus, this technique for recovery is incapable of effecting separation of the impurities.

It is accordingly an object of this invention to provide a new and improved method for the recovery of cephalothin salts in which undesirable impurities are removed.

It is a more specific object of the invention to provide an improved method for the recovery of cephalothin salts from aqueous solution by which a salt of enhanced pharmaceutical acceptability is obtained.

It is a related object of the present invention to provide an improved method for the recovery of cephalothin salts which results in a product having increased stability.

It has been found in accordance with the concepts of this invention that the alkali metal salts of cephalothin can be selectively precipitated from aqueous solution thereof without co-precipitation of colorizing impurities by adding to the aqueous solution an alkali metal salt whereby the cephalothin salt is precipitated leaving the colorizing impurities remaining in the aqueous solution. The cephalothin salt thus obtained is not only substantially free of these impurities, but is also characterized by improved stability on aging.

In accordance with the practice of this invention, the alkali metal salt is added to a relatively concentrated aqueous solution of the cephalothin salt to selectively precipitate the cephalothin salt without co-precipitation of the impurities. The concentration of the cephalothin salt in the aqueous solution from which the cephalothin salt is separated is not critical to the practice of this invention. The lower limit of this concentration, as a practical matter, is set by the desired yield while the upper limit is the concentration at which the solution of the cephalothin salt is saturated at the temperature of the solution. For example, at a temperature of 25°C., sodium cephalothin forms a saturated solution when present in an amount of about 230–250 mg./ml. of water. For best results, it is generally preferred to make use of an aqueous solution which contains at least 10% by weight of the cephalothin salt.

As the alkali metal salt, use can be made of any of a variety of non-toxic salts. It is generally preferred to make use of an alkali metal salt of an acid having a pK$_a$ less than about 5. Preferred alkali metal salts are the alkali metal salts of organic carboxylic acids as represented by acetic, citric, lactic, maleic, fumaric, gluconic and glutaric acids. Alkali metal salts of formic acid can also be used if care is taken to remove by-product formic acid from the separated alkali metal cephalothin. The alkali metal halides, such as alkali metal bromides and chlorides can be used in the practice of this invention, although the use of such halide salts are not preferred since concentrated solutions thereof are corrosive. It is generally preferred that the cation of the alkali metal salt correspond to the cation of the cephalothin salt to avoid the introduction of extraneous cations into the system.

It is generally desirable to employ sufficient quantities of the alkali metal salt to precipitate substantially all of the cephalothin values from the solution. For this purpose, it is preferred to employ the alkali metal salt in quantities in the range of 0.5 to 8.0 parts by weight per part by weight of cephalothin salt contained in the aqueous solution. However, as will be appreciated by those skilled in the art, excess quantities of the alkali metal salt can be employed although there is frequently no advantage in using such quantities in excess of those forming a saturated solution of the alkali metal salt in the aqueous solution.

The alkali metal salt can be added to the aqueous solution of the cephalothin salt in any of a variety of forms. For example, the salt may be used in solid form or in the form of a concentrated solution in a liquid carrier such as water or a lower alkanol(e.g., ethanol, isopropanol, butanol, etc.). To avoid yield-lowering dilution by water and to permit a cleaning and sterilizing filtration, the alkali metal salt added to selectively precipitate the cephalothin salt can be employed in the form of a solution in an alkanol. For example, it is frequently preferred to make use of a solution of the alkali metal salt in an alkanol containing 20 to 60 percent by weight of the alkali metal salt.

After addition of the alkali metal salt, a precipitate of the cephalothin salt is obtained which can be separated from the aqueous mother liquor containing the colorizing impurities still in solution in a conventional manner, as by, for example, filtration and/or centrifugation.

The process of the invention thus results in a product in yields of the order of 80 to 90 percent containing significantly reduced quantities of impurities. In addition, the product obtained as a result of the process of this invention exhibits significantly improved stability with respect to formation of new quantities of impurities on aging in aqueous solution.

Having described the basic concepts of the invention, reference is now made to the following examples which are provided by way of illustration, and not of limitation, of the practice of the invention.

EXAMPLE 1

The sodium salt of cephalothin having an impurities content of 18 mg/g. is dissolved in water to form a solution containing 100 g. of the salt per 400 ml. of water. The resulting solution is a clear solution having a yellow coloration.

To this solution, there is added 100 g. of ground sodium chloride. The solution is stirred, and crystallization is observed upon completion of the NaCl addition. The resulting suspension is then allowed to stand for about 30 minutes to insure complete dissolution of the NaCl.

The crystals thus formed are harvested by filtration, and washed with an aqueous solution of ethanol. The product, sodium cephalothin, is dried under vacuum for several hours, and is found to have an impurities content of 2.0 mg/g. The yield is 90 percent.

A sample of 100 g. of the purified sodium cephalothin is then densified by treating with 15 ml. of water to form a paste which is allowed to dry in room atmosphere overnight.

The densified material is ground and sieved to pass through a No. 30 mesh screen. Analysis indicates that no significant change in the impurities content was caused by the additional water treatment.

EXAMPLE 2

A sample of 100 g. of sodium cephalothin having an impurities content of 18.0 mg/g. is dissolved in 400 ml. of water to form a yellow solution.

Thereafter, a solution containing 55 percent by weight sodium lactate in ethanol is added to the aqueous solution of the sodium cephalothin. After addition of about 100 g. of solution, precipitation commences. The sodium cephalothin crystals are then separated and washed in accordance with the procedure described in Example 1, and are found to have an impurities content of about 3.0 mg/g.

EXAMPLE 3

This example demonstrates the improved stability of cephalothin salt treated in accordance with the process of this invention as compared to salts recovered using isopropanol.

In determining the stability of products treated in accordance with this invention, samples of sodium cephalothin recovered with sodium lactate in accordance with the procedure described in Example 2 and samples recovered using isopropanol are dissolved in sterile water and aged for 48 hours either at room temperature (25°C.) or at 5°C. The aging was carried out with two concentrations of sodium cephalothin, at 0.54 M corresponding to ampoule condition (e.g., 1 g. of salt in 4 ml. of diluent) and at 0.01 M corresponding to intravenous infusion conditions (i.e., 4 g. of salt in 1000 ml. of diluent).

For each example, the impurities content is determined by means of a protamine-nephelometric assay. In this method, the impurities are precipitated from a cephalothin salt solution by the addition of protamine. The resulting turbidity is then compared with the turbidity obtained in like manner from solutions of cephalothin salts containing known amounts of the impurities. In the test employed in this example, 0.5 ml. of a 0.1 percent solution of protamine sulfate is slowly added at a controlled rate to a test solution of 0.005 M cephalothin salt and 0.01 M sodium phosphate at a pH of 7.0, and the resulting turbidity is measured in accordance with conventional procedures.

The results of the aging tests are shown in Table I.

TABLE I

| Mode of Recovery | Concen. | Temp. | Time (hrs.) | pH | mg. impurities/g Na cephalothin |
|---|---|---|---|---|---|
| Isopropanol | 0.54 M | 25°C. | 0 | 5.2 | 7.72 |
| | | | 6 | 4.9 | 15.93 |
| | | | 24 | 4.85 | 17.12 |
| | | | 48 | 4.65 | 38.06 |
| Na lactate in ethanol | 0.54 M | 25°C. | 0 | 5.4 | 1.05 |
| | | | 6 | 4.9 | 4.29 |
| | | | 24 | 4.8 | 12.60 |
| | | | 48 | 4.6 | 25.93 |
| Isopropanol | 0.54 M | 5°C. | 0 | 5.2 | 7.54 |
| | | | 6 | 5.2 | 10.71 |
| | | | 24 | 5.25 | 11.18 |
| | | | 48 | 5.2 | 12.60 |
| Na lactate in ethanol | 0.54 M | 5°C. | 0 | 5.4 | 1.05 |
| | | | 6 | 5.25 | 1.83 |
| | | | 24 | 5.35 | 1.81 |
| | | | 48 | 5.25 | 2.07 |
| Isopropanol | 0.01 M | 25°C. | 0 | 5.1 | 7.83 |
| | | | 6 | 4.7 | 14.86 |
| | | | 24 | 4.5 | 35.93 |
| | | | 48 | 4.5 | 61.29 |
| Na lactate in ethanol | 0.01 M | 25°C. | 0 | 5.4 | 1.21 |
| | | | 6 | 4.6 | 4.33 |
| | | | 24 | 4.4 | 26.76 |
| | | | 48 | 4.4 | 52.83 |
| Isopropanol | 0.01 M | 5°C. | 0 | 5.1 | 7.60 |
| | | | 6 | 4.95 | 10.86 |
| | | | 24 | 4.85 | 10.59 |
| | | | 48 | 4.75 | 11.16 |
| Na lactate in ethanol | 0.01 M | 5°C. | 0 | 5.3 | 1.19 |
| | | | 6 | 5.1 | 1.24 |
| | | | 24 | 4.85 | 1.43 |
| | | | 48 | 4.75 | 1.52 |

As can be seen from Table I, the process of the present invention provides a cephalothin salt having improved stability, particularly where the aqueous solution of the salt is stored under refrigeration (i.e., at 5°C).

EXAMPLE 4

A potassium salt of cephalothin having an impurities content of about 15 mg/g. is dissolved in water to form a solution containing 25 percent by weight of the cephalothin salt.

To this solution there is added about 85 g. of potassium lactate crystals. The resulting mixture is stirred for about 10 minutes, and is then allowed to stand to insure complete dissolution of the potassium lactate.

Thereafter, the crystals which are formed in the aqueous solution are separated by filtration, and washed in aqueous ethanol. The product is treated under vacuum and is found to be potassium cephalothin having an impurities content of about 3.0 mg/g.

EXAMPLE 5

To a solution containing 26 percent by weight sodium cephalothin in water, there is added 105 g. of sodium acetate in the form of a saturated solution of sodium acetate and water.

The sodium cephalothin crystals formed as a result of adding the sodium acetate are then separated in the manner described in Example 1, washed and dried. The sodium cephalothin is found to have a significantly reduced impurities content.

EXAMPLE 6

The procedure of Example 5 is repeated except that the salt added is sodium citrate. The sodium cephalothin separated from the aqueous solution is again found to have a significantly reduced impurities content.

It will be understood from the foregoing that various changes and modifications can be made in the details of formulation, procedure and use without departing from the spirit of the invention, especially as defined in the following claims.

We claim:

1. In a process for the recovery of an alkali metal salt of 7-(2'-thienylacetamido)cephalosporanic acid from an aqueous solution thereof, the improvement which comprises adding a non-toxic alkali metal salt selected from the group consisting of an alkali metal halide and an alkali metal salt of an organic carboxylic acid having a $pK_a$ less than 5 to the aqueous solution to precipitate the salt of the 7-(2'-thienylacetamido)cephalosporanic acid, and separating the precipitate of the alkali metal salt of the 7-(2'-thienylacetamido)cephalosporanic acid thus formed.

2. A process as defined in claim 1 wherein the alkali metal of the non-toxic salt corresponds to the alkali metal of the cephalosporanic acid salt.

3. A process as defined in claim 1 wherein the aqueous solution contains at least 10 percent by weight of the cephalosporanic acid salt.

4. A process as defined in claim 1 wherein the non-toxic salt is an alkali metal lactate.

5. A process as defined in claim 1 wherein the concentration of the cephalothin salt in the aqueous solution is within the range of 10 percent by weight up to the saturation concentration.

6. A process as defined in claim 1 wherein the non-toxic salt is employed in an amount within the range of 0.5 to 8.0 parts by weight per part by weight of the cephalosporanic acid salt in the aqueous solution.

7. A process as defined in claim 1 wherein the non-toxic alkali metal salt is added to the aqueous solution in the form of a concentrated solution in a liquid carrier.

8. A process as defined in claim 9 wherein the liquid carrier is selected from the group consisting of water, a lower alkanol and mixtures thereof.

9. In a process for the recovery of the sodium salt of 7-(2'-thienylacetamido)cephalosporanic acid from an aqueous solution thereof, the improvement comprising adding a non-toxic sodium salt selected from the group consisting of sodium halide and an alkali metal salt of an organic carboxylic acid having a $pK_a$ less than 5 to the aqueous solution to precipitate the cephalosporanic acid salt, and separating the precipitate of the sodium salt of 7-(2'-thienylacetamido)cephalosporanic acid thus obtained.

10. A process as defined in claim 9 wherein the non-toxic sodium salt is sodium lactate.

11. A process as defined in claim 9 wherein the non-toxic sodium salt is added in the form of a solution of said salt in a lower alkanol.

* * * * *